United States Patent Office 3,378,462
Patented Apr. 16, 1968

3,378,462
PROCESS FOR STARCH LIQUEFACTION
Leo John Denault and Peter Raymond Casey, Elkhart, Ind., assignors to Miles Laboratories, Inc., Elkhart, Ind., a corporation of Indiana
No Drawing. Filed Nov. 12, 1964, Ser. No. 410,713
9 Claims. (Cl. 195—31)

This invention relates to a process for the liquefaction of starch. More particularly, it relates to an improved dual enzyme process for converting starch to dextrose.

It is well known in the art that starch, such as corn starch, can be hydrolyzed to form sugars, such as dextrose. Acids, such as hydrochloric acid, have been widely used to catalyze such hydrolysis. Such "acid-converted" starch products have the disadvantage, however, that they contain undesirable amounts of reversion sugars, such as gentiobiose, isomaltose, panose and the like. These reversion sugars are unfermentable by yeast, for example, and thus reduce the utility of acid-converted starch products as fermentation substrates for the production of other useful products.

In an effort to overcome the disadvantages of acid conversion, the art substituted an enzyme conversion. Enzymes, such as alpha-amylase and amyloglucosidase, were employed to catalyze the starch hydrolysis. Enzyme converted syrups, for example, possess distinct advantages over acid-converted syrups. The enzyme converted syrups contain desirable low amounts of reversion sugars, and at least as much and generally more dextrose than is produced by acid conversion.

In order for the enzymes to be most effective in converting the starch to desirable sugars, the starch must be somewhat liquefied. Such liquefaction can be accomplished by partial acid conversion, as described above, or by an enzyme conversion. The "all-enzyme" processes of the prior art have employed an alpha-amylase to liquefy the starch and an amyloglucosidase to convert the liquefied starch to sugar. Such prior art processes still had disadvantages, however. Partial acid conversion to liquefy the starch still forms undesirable reversion products. Even the use of amylase for liquefaction still had the disadvantage that an undesirably high amount of insoluble material remained after saccharification by amyloglucosidase, for example, which interfered with subsequent isolation of the produced sugars. These insolubles formed a high filter cake weight and required relatively long filtration times to separate the insolubles from the sugar-containing solution. Since these insolubles contained starch which was not converted to dextrose, they represented a loss of product.

Prior art amylase-liquefied starch also retrograded to form undesirable gels upon standing. It was therefore necessary to use the prior art liquefied starch shortly after its preparation.

It is an object of the present invention to provide an improved process for liquefaction of starch which substantially reduces the amount of insoluble materials.

It is another object of the present invention to provide an improved "all-enzyme" process for converting starch to dextrose wherein the overall conversion of starch to dextrose is increased.

In accordance with the present invention a process is provided for liquefaction of starch which comprises adding to an aqueous slurry of starch-containing material a minor amount of water-soluble calcium compound and subjecting the resulting slurry to the action of an amylase to liquefy substantially all the starch in said slurry. Preferably the slurry also contains a minor amount of water-soluble sodium compound. More particularly, the process comprises adding to an aqueous slurry of starch-containing material a water-soluble calcium compound so as to form a calcium content molarity of from about 0.003 to about 0.03 and subjecting the resulting slurry to the action of an amylase to liquefy substantially all the starch in said slurry. Preferably the calcium molarity is about 0.01. In the preferred form of the invention the slurry also contains a water-soluble sodium compound so as to form a sodium content molarity of from about 0.006 to about 0.06 and wherein the molar ratio of sodium/calcium in said slurry is about 2/1.

The calcium and sodium water-soluble compounds can be added together or they can be added in various sequences. One process variation is to add calcium hydroxide, for example, to obtain the desired pH level, then add another water-soluble calcium compound, such as calcium chloride, to achieve the desired molarity content of calcium. A sodium compound, such as sodium chloride, is then added to achieve the desired sodium molarity. Another process variation is to add the desired amount of calcium compound to achieve the desired calcium molarity content, add sodium hydroxide to obtain the desired pH level and then add sodium chloride, for example, to achieve the appropriate sodium molarity. Still another variation is to mix an aqueous solution of calcium compound, sodium compound and appropriate alkaline material and then add this mixture to the aqueous starch slurry to achieve the desired overall molarity and pH values.

Any water-soluble calcium compound, such as calcium acetate, calcium chloride, calcium citrate, calcium hydroxide, calcium hypophosphite, calcium lactate, and the like can be used. Calcium chloride is the preferred compound to be used in the present novel process.

Any water-soluble sodium compound can be used. Exemplary compounds are sodium acetate, sodium bicarbonate, sodium carbonate, sodium chloride, sodium citrate, sodium hydroxide, and the like. Sodium chloride is the preferred compound to be used in the present novel process.

The starch-containing materials used in the present process can be substantially pure starches or they can be crude starch-containing materials. As to the purified starches, they can be obtained from corn, wheat, potatoes and the like. Crude starches from corn, wheat, potatoes and the like can also be used. Various streams from both wet and dry corn milling processes can also be used. These strains include such materials as starch liquors, ground whole corn, corn flour, brewer's grits or wet cereal milling plant fractions, such as centrifuge streams, clarifier underflow and degermed primary mill stream slurries. Various other crude starchy materials with which the art is familiar can likewise be used.

Liquefaction of the starch-containing material is accomplished by subjecting the aqueous starch-containing slurry also containing the above described calcium compound, and also preferably containing the above described sodium compound, to the action of an amylase. The aqueous starch-containing slurry preferably contains from about 25 to about 40 weight percent of starch-containing material (dry solids basis). The amylase obtained from either fungal or bacterial sources is well known in the art and is prepared by well known procedures. The amylase is preferably alpha-amylase. This amylase should be used in an amount containing at least about 150,000 MW units per pound of starch-containing dry solids. An MW unit is the amount of amylase activity that will dextrinize 1 mg. of starch to the desired end point under standard assay conditions. The standard assay conditions are: 10 ml. of 1 weight percent soluble starch; 40° C.; pH 5.4; 30 min. incubation time; enzyme solution to be tested of such concentration that 1 ml. will produce desired end point within 30 minute incubation period. The desired end point is when the color produced by adding the starch-enzyme mixture to dilute iodine matches that of a standard color disc. The standard color disc is Hellige 620S-5 marketed by Hellige, Inc., 877 Stewart Ave., Garden City, N.Y.

The starch-containing material is treated with the liquefying amylase at a temperature of from about 170° F. to about 200° F. (about 76° C. to 93° C.), preferably from about 185° F. to about 195° F. (about 85° C.–90° C.) for about 25 to about 45 minutes at a pH of about 5.5 to about 7.7. Preferably the pH is about 7.0. When the process is carried out under these conditions, the liquefaction is more complete, the liquefied starch is not subject to retrogradation, the amount of insoluble solids is reduced, the subsequent saccharification conversion efficiency is improved, and the results are more uniform and reproducible.

The liquefied starch solution obtained by the above described process can be used in various ways. It is especially useful as the raw material to an enzyme process for saccharification of the starch to produce sugar. In the production of dextrose, the dextrose-containing product solution obtained by saccharification of the above liquefied starch is more easily and quickly filtered than the prior art dextrose-containing solutions obtained from prior art "all-enzyme" processes. Since the total amount of insolubles is also reduced, the total weight of filter cake is substantially reduced. This reduces loss of material as well as speeds up production time and reduces overall production costs. It also increases overall production of dextrose from a given starting quantity of starch.

Saccharification, or conversion of the liquefied starch to dextrose, is brought about by cooling the liquefied starch-containing material to a temperature of about 130° F. to about 144° F. (about 54° C.–62° C.), adjusting the pH to a value of about 3.5 to about 5.5 by well known techniques, such as by addition of hydrochloric acid, adding to said solution an amyloglucosidase and maintaining the resulting mixture at a temperature of about 130° F. to about 144° F., for about 62 to about 96 hours, preferably about 65 to about 90 hours.

The amyloglucosidase is employed in a concentration or potency of about 70 to about 95 units per pound of starch-containing material dry solids in the liquefied starch solution. A unit is the amount of enzyme that will catalyze the production of one gram of dextrose in one hour under standard assay conditions. Thus, a concentration of 70–95 units of enzyme will produce 70–95 grams of dextrose in one hour under standard assay conditions. The standard assay conditions are 2 g. of soluble starch in a 4 weight percent aqueous solution; pH 4.2 with sodium acetate-acetic acid buffer; 60° C.; 1 hour incubation; enzyme solution to be tested of such concentration that 1 ml. will catalyze hydrolysis of 20–30 weight percent of the starch during the 1 hour period. The content of reducing sugars, calculated as dextrose, of the enzyme converted starch is determined by the well known Schoorl method.

When a crude starch-containing material is employed, the amyloglucosidase should be substantially free from protease, lipase and transglucosidase activity. Such amyloglucosidase can be obtained through a refining treatment of a crude amyloglucosidase fungal extract liquor. The crude liquor is obtained by well known fermentation techniques. The refining of crude amyloglucosidase, when needed, can be carried out by methods known in the prior art. Alternatively, some fungal strains are known to produce a culture liquor containing amyloglucosidase which is substantially free from protease, lipase and transglucosidase activity. When such strains of fungi are employed, the resulting crude culture liquor can be used, without the necessity for subsequent refining, for saccharification in the present novel process.

The invention will be further described in the following examples.

EXAMPLE 1

Corn starch (100 lb.) containing 10 weight percent moisture was mixed with sufficient water to form a slurry having a total volume of 30 gal. and containing about 32 weight percent starch. To this slurry were added 56.75 g. of $CaCl_2 \cdot 2H_2O$ to form a slurry having calcium molarity content of 0.0034 and a pH of 5.9. Bacterial alpha-amylase was then added in an amount to provide 175,000 MW units of enzyme activity per pound of starch-containing dry solids in the above prepared slurry. The resulting mixture was then heated to 185° F.–195° F. in a steam jet cooker and then passed into a holding tank where it was maintained at 185° F.–195° F. for a total of 45 minutes. The resulting product was a solution wherein substantially all the original starch was now liquefied. This solution was an improvement over the prior art in that it can be stored for relatively long periods of time without retrograding to a solid gel. Prior art liquefied starch readily formed undesirable gels.

EXAMPLE 2

The liquefied starch solution prepared in Example 1 above was cooled to 140° F., the pH was adjusted to 4.0 during cooling by addition of phosphoric acid, amyloglucosidase was added in an amount of 80 units per pound of dry starch solids in the liquefied solution, and the resulting mixture was maintained at 140° F. for 90 hours. The saccharified product was easily filtered resulting in a remarkably low filter cake weight of 0.90 weight percent based on total weight of filter cake and dissolved sugar solids in the saccharified solution. Prior art processes not employing the addition of calcium compounds during liquefaction of the starch had corresponding saccharified solution filter cake weights of as high as 1.7 weight percent. The filtered product from this example had a specific rotation at 25° C. of 56.25 and a dextrose equivalent sugar content of 96.9 percent. This indicated that 96.9 weight percent of the dissolved solids were copper reducing sugars expressed as dextrose.

EXAMPLE 3

The procedure of Example 1 above was repeated and 113.5 g. of $CaCl_2 \cdot 2H_2O$ were added to form a slurry having a calcium molarity content of 0.007 and a pH of 5.8. The resulting liquefied starch solution was then treated in the manner described in Example 2 above for 93 hours at 140° F. the saccharified product was easily filtered to produce a filter cake weight of only 0.84 weight percent based on total weight of filter cake and dissolved sugar solids in the saccharified solution. A comparison of the filter cake weight percent in this example and that of Example 2 above indicates that as the calcium content increases, the filter cake weight desirably decreases. The saccharified product of this example had a specific rotation of 56.1 and dextrose equivalent sugar content of 97.1.

EXAMPLE 4

The procedure of Example 1 above was repeated wherein $Ca(OH)_2$ was added to a pH of 7.0 and $$CaCl_2 \cdot 2H_2O$$

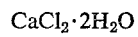

was added to form a calcium molarity content of 0.007. The resulting liquefied starch solution was then treated in the manner described in Example 2 above for 93 hours at 140° F. The saccharified product had a specific rotation of 56.3, a dextrose equivalent sugar content of 96.5 and was easily filtered to produce a filter cake weight percent of 0.81.

EXAMPLE 5

The procedure of Example 1 above was repeated using an aqueous corn starch slurry prepared from 136 lb. (dry basis) of corn starch and sufficient water to form a slurry having a total volume of 45 gal. and containing 30 weight percent starch. To this slurry were added 250 g.

of $CaCl_2 \cdot 2H_2O$ to produce a calcium molarity content of 0.01. Sodium hydroxide (32.5 g.) was then added to achieve pH 7.0. Sodium chloride (149 g.) was then added to form a sodium molarity content of 0.02 (sodium/calcium molar ratio of 2/1). The resulting liquefied starch solution was then treated in the manner described in Example 2 above for 65 hours at 140° F. The saccharified product was easily filtered at a rate of 15.5 gals./sq. foot of filtration area/hr. This is a filtration rate about twice as great as that of the prior art wherein calcium and sodium compounds were not employed during starch liquefaction. The resulting filter cake weight was only 0.70 weight percent based on total weight of filter cake and dissolved sugar solids in the saccharide solution. This filtered product had a specific rotation of 56.4 and a dextrose equivalent sugar content of 97.1. This example shows that the preferred combination of calcium and sodium compounds in starch liquefaction further reduces the filter cake weight.

EXAMPLE 6

The procedure of Example 1 above was repeated using an aqueous corn starch slurry prepared from 910 lb. (dry basis) corn starch and sufficient water to form a slurry having a total volume of 300 gal. and containing 30 weight percent starch. To this slurry were added 1135 g. of $CaCl_2 \cdot 2H_2O$ to form a slurry having a calcium molarity content of 0.007. Sodium hydroxide (192 g.) was then added to achieve pH 7.0. Sodium chloride (602 g.) was then added to form a sodium molarity content of 0.014. The resulting liquefied starch solution was then treated in the manner described in Example 2 above for 92 hours at 140° F. The saccharified product was easily filtered at a rate of 11.5 gals./sq. foot of filtration area/ hour through a 4 sq. foot rotary drum vacuum filter precoated with diatomaceous earth. The resulting filter cake weight was only 0.66 weight percent based on total weight of filter cake and dissolved sugar solids in the saccharified solution. The filtered product had a dextrose equivalent of 97.6 percent and a specific rotation at 25° C. of 55.9.

The dextrose-containing products obtained by the process of the present invention can be used in various ways known to the sugar art.

In summary, the present invention relates to an improved process for liquefying starch wherein critical amounts of calcium and sodium compounds are present along with the liquefying amylase to produce more complete liquefaction. When the resulting liquefied starch is then saccharified by means of amyloglucosidase treatment, the resulting dextrose-containing solution is more quickly and easily filtered with smaller filter cake weights than are achieved by prior art processes.

We claim:
1. A process for liquefaction of starch which comprises adding to an aqueous slurry of starch-containing material a water-soluble calcium compound so as to form a calcium content molarity of from about 0.003 to about 0.03, adding a water-soluble sodium compound so as to form a sodium content molarity of from about 0.006 to about 0.06 and wherein the molar ratio of sodium/calcium in said slurry is about 2/1, and subjecting the resulting slurry to the action of an amylase to liquefy substantially all the starch in said slurry.

2. A process according to claim 1 wherein the calcium is present in a molarity amount of about 0.01 and the sodium is present in a molarity amount of about 0.02.

3. A process according to claim 1 wherein the water-soluble calcium compound is calcium chloride and the water-soluble sodium compound is sodium chloride.

4. A process according to claim 1 wherein the slurry is subjected to the action of an amylase at a temperature of from about 170° F. to about 200° F. and at a pH of from about 5.5 to about 7.7.

5. A process according to claim 1 wherein the slurry is subjected to the action of an amylase at a temperature of from about 185° F. to about 195° F. and at a pH of about 7.0.

6. A process according to claim 1 wherein the calcium molarity content is about 0.01, the slurry is adjusted to a pH of about 7.0 by means of sodium hydroxide and then sodium chloride is added in an amount to form a total sodium molarity content of 0.02.

7. A process for liquefaction of starch which comprises adding to an aqueous slurry of starch-containing material calcium chloride so as to form a calcium content molarity of about 0.01, adjusting the pH of the resulting slurry to a value of about 7.0 by means of sodium hydroxide, adding sodium chloride to the slurry so as to form a total sodium content molarity in the slurry of about 0.02, and then subjecting the resulting slurry to the action of an alpha-amylase at a temperature of about 185° F. to about 195° F. to liquefy substantially all the starch in said slurry.

8. A process of converting starch to dextrose-containing products which comprises the steps of adding to an aqueous slurry of starch-containing material a water-soluble calcium compound so as to form a calcium content molarity of from about 0.003 to about 0.03, adding a water-soluble sodium compound so as to form a sodium content molarity of from about 0.006 to about 0.06 and wherein the molar ratio of sodium/calcium in said slurry is about 2/1, subjecting the resulting slurry to the action of an amylase to liquefy substantially all the starch in said slurry, and then subjecting the liquefied starch to the action of an amyloglucosidase to convert the liquefied starch to dextrose.

9. A process of converting starch to dextrose-containing products which comprises adding to an aqueous slurry of starch-containing material calcium chloride so as to form a calcium content molarity of about 0.01, adjusting the pH of the resulting slurry to a value of about 7.0 by means of sodium hydroxide, adding sodium chloride to the slurry so as to form a total sodium content molarity in the slurry of about 0.02, subjecting the resulting slurry to the action of an alpha-amylase at a temperature of about 185° F. to about 195° F. to liquefy substantially all the starch in said slurry, and then subjecting the liquefied starch to the action of an amyloglucosidase at a temperature of about 130° F. to about 144° F. and at a pH of about 3.5 to about 5.5 to convert the liquefied starch to dextrose.

References Cited

UNITED STATES PATENTS

| | | | |
|---|---|---|---|
| 2,153,445 | 4/1939 | Willaman et al. | 195—17 |
| 2,738,305 | 3/1956 | Lohmar et al. | 195—17 |
| 3,039,936 | 6/1962 | Lenney et al. | 195—11 |

LIONEL M. SHAPIRO, *Primary Examiner.*

A. LOUIS MONACELL, *Examiner.*